(12) United States Patent
Nathan et al.

(10) Patent No.: US 7,188,352 B2
(45) Date of Patent: Mar. 6, 2007

(54) INTELLIGENT DIGITAL AUDIOVISUAL PLAYBACK SYSTEM

(75) Inventors: Guy Nathan, Yerres (FR); Tony Mastronardi, Pierrefonds (CA)

(73) Assignee: Touchtunes Music Corporation, Las Vegas, NV (US)

(*) Notice: Subject to any disclaimer, the term of this patent is extended or adjusted under 35 U.S.C. 154(b) by 0 days.

(21) Appl. No.: 08/817,689

(22) PCT Filed: Oct. 12, 1995

(86) PCT No.: PCT/FR95/01333

§ 371 (c)(1),
(2), (4) Date: Jun. 13, 1997

(87) PCT Pub. No.: WO96/12256

PCT Pub. Date: Apr. 25, 1996

(65) Prior Publication Data

US 2003/0101447 A1    May 29, 2003

(30) Foreign Application Priority Data

Jul. 11, 1995 (FR) .................................. 95 08391

(51) Int. Cl.
*H04N 7/16* (2006.01)
*H04N 7/173* (2006.01)
(52) U.S. Cl. .......................... 725/7; 725/100; 434/307 A
(58) Field of Classification Search ............... 725/5–7, 725/100; 434/307 A
See application file for complete search history.

(56) References Cited

U.S. PATENT DOCUMENTS

| | | | |
|---|---|---|---|
| 3,982,620 A | 9/1976 | Kortenhaus | |
| 4,186,438 A | 1/1980 | Benson et al. | |
| 4,232,295 A | 11/1980 | McConnell | |
| 4,335,809 A | 6/1982 | Wain | |
| 4,335,908 A | 6/1982 | Burge | |
| 4,412,292 A | 10/1983 | Sedam et al. | |
| 4,521,014 A | 6/1985 | Sitrick | |
| 4,528,643 A | 7/1985 | Freeny, Jr. | |

(Continued)

FOREIGN PATENT DOCUMENTS

AU     199954012     4/2000

(Continued)

OTHER PUBLICATIONS

"High-speed Opens and Shorts Substrate Tester", IBM Technical Disclosure Bulletin, vol. 33, No. 12, May 1991, pp. 251-259.

(Continued)

*Primary Examiner*—Andrew Y. Koenig
(74) *Attorney, Agent, or Firm*—Nixon & Vanderhye P.C.

(57) ABSTRACT

Payment-based audiovisual playback system characterized by comprising a microprocessor unit, primarily including storage means for storing inter alia in digital form the visual and sound information to be used, and associated, through a number of interfaces, with display means for sound playback which provide a multimedia environment. The unit is controlled by a multitask operating system including a library of integrated tools and services in the storage means. The system is also associated, through an interface, with a telecommunications modem and is connectable to an audiovisual information distribution network by a telecommunications modem and telecommunications links, the telecommunications functions also being managed by the multitask operating system.

9 Claims, 6 Drawing Sheets

U.S. PATENT DOCUMENTS

| | | | |
|---|---|---|---|
| 4,558,413 A | 12/1985 | Schmidt | |
| 4,572,509 A | 2/1986 | Sitrick | |
| 4,582,324 A | 4/1986 | Koza et al. | |
| 4,593,904 A | 6/1986 | Graves | |
| 4,597,058 A | 6/1986 | Izumi et al. | |
| 4,636,951 A | 1/1987 | Harlick | |
| 4,652,998 A | 3/1987 | Koza et al. | |
| 4,654,799 A | 3/1987 | Ogaki et al. | |
| 4,658,093 A | 4/1987 | Hellman | |
| 4,667,802 A * | 5/1987 | Verduin et al. | 194/217 |
| 4,675,538 A | 6/1987 | Epstein | |
| 4,677,311 A | 6/1987 | Morita | |
| 4,677,565 A | 6/1987 | Ogaki | |
| 4,703,465 A | 10/1987 | Parker | |
| 4,707,804 A | 11/1987 | Leal | |
| 4,722,053 A | 1/1988 | Dubno | |
| 4,761,684 A | 8/1988 | Clark et al. | |
| 4,766,581 A | 8/1988 | Korn et al. | |
| 4,787,050 A | 11/1988 | Suzuki | |
| 4,792,849 A | 12/1988 | McCalley | |
| 4,811,325 A | 3/1989 | Sharples, Jr. et al. | |
| 4,825,054 A | 4/1989 | Rust | |
| 4,829,570 A | 5/1989 | Schotz | |
| 4,868,832 A | 9/1989 | Marrington | |
| 4,920,432 A | 4/1990 | Eggers | |
| 4,922,420 A | 5/1990 | Nakagawa et al. | |
| 4,924,378 A | 5/1990 | Hershey | |
| 4,926,485 A | 5/1990 | Yamashita | |
| 4,937,807 A | 6/1990 | Weitz et al. | |
| 4,949,187 A | 8/1990 | Cohen | |
| 4,953,159 A * | 8/1990 | Hayden et al. | 370/265 |
| 4,956,768 A | 9/1990 | Sidi et al. | |
| 4,958,835 A | 9/1990 | Tashiro et al. | |
| 4,999,806 A | 3/1991 | Chernow | |
| 5,012,121 A | 4/1991 | Hammond | |
| 5,041,921 A | 8/1991 | Scheffler | |
| 5,058,089 A | 10/1991 | Yoshimaru et al. | |
| 5,117,407 A * | 5/1992 | Vogel | 386/97 |
| 5,138,712 A | 8/1992 | Corbin | |
| 5,155,847 A | 10/1992 | Kirouac | |
| 5,163,131 A | 11/1992 | Row | |
| 5,166,886 A | 11/1992 | Molnar | |
| 5,191,573 A | 3/1993 | Hair | |
| 5,191,611 A | 3/1993 | Lang | |
| 5,192,999 A | 3/1993 | Graczyk | |
| 5,197,094 A | 3/1993 | Tillery | |
| 5,203,028 A | 4/1993 | Shiraishi | |
| 5,237,157 A | 8/1993 | Kaplan | |
| 5,237,322 A | 8/1993 | Heberle | |
| 5,239,480 A | 8/1993 | Huegel | |
| 5,250,747 A | 10/1993 | Tsumura | |
| 5,252,775 A | 10/1993 | Urano | |
| 5,260,999 A | 11/1993 | Wyman | |
| 5,262,875 A | 11/1993 | Mincer et al. | |
| 5,276,866 A | 1/1994 | Paolini | |
| 5,282,028 A * | 1/1994 | Johnson et al. | 725/139 |
| 5,315,161 A | 5/1994 | Robinson | |
| 5,339,413 A | 8/1994 | Koval | |
| 5,341,350 A * | 8/1994 | Frank et al. | 710/48 |
| 5,355,302 A * | 10/1994 | Martin et al. | 700/234 |
| 5,357,276 A | 10/1994 | Banker | |
| 5,369,778 A | 11/1994 | SanSoucie | |
| 5,375,206 A | 12/1994 | Hunter | |
| 5,418,713 A | 5/1995 | Allen | |
| 5,420,923 A | 5/1995 | Beyers | |
| 5,428,252 A | 6/1995 | Walker | |
| 5,431,492 A | 7/1995 | Rothschild | |
| 5,445,295 A | 8/1995 | Brown | |
| 5,455,926 A | 10/1995 | Keele | |
| 5,457,305 A | 10/1995 | Akel | |
| 5,465,213 A | 11/1995 | Ross | |
| 5,469,370 A * | 11/1995 | Ostrover et al. | 711/111 |
| 5,471,576 A * | 11/1995 | Yee | 715/500.1 |
| 5,475,835 A | 12/1995 | Hickey | |
| 5,481,509 A * | 1/1996 | Knowles | 369/30 |
| 5,487,167 A * | 1/1996 | Dinallo et al. | 715/500.1 |
| 5,495,610 A | 2/1996 | Shing | |
| 5,496,178 A | 3/1996 | Back | |
| 5,499,921 A | 3/1996 | Sone | |
| 5,511,000 A | 4/1996 | Kaloi | |
| 5,513,117 A | 4/1996 | Small | |
| 5,521,918 A * | 5/1996 | Kim | 370/428 |
| 5,521,922 A * | 5/1996 | Fujinami et al. | 370/543 |
| 5,548,729 A | 8/1996 | Akiyoshi | |
| 5,550,577 A | 8/1996 | Verbiest | |
| 5,555,244 A | 9/1996 | Gupta | |
| 5,557,541 A | 9/1996 | Schulhof | |
| 5,559,505 A | 9/1996 | McNair | |
| 5,559,549 A | 9/1996 | Hendricks | |
| 5,561,709 A | 10/1996 | Remillard | |
| 5,566,237 A | 10/1996 | Dobbs | |
| 5,570,363 A | 10/1996 | Holm | |
| 5,583,994 A | 12/1996 | Rangan | |
| 5,592,551 A | 1/1997 | Lett | |
| 5,594,509 A | 1/1997 | Florin | |
| 5,596,702 A * | 1/1997 | Stucka et al. | 715/746 |
| 5,612,581 A | 3/1997 | Kageyama | |
| 5,613,909 A | 3/1997 | Stelovsky | |
| 5,619,247 A | 4/1997 | Russo | |
| 5,619,698 A | 4/1997 | Lillich | |
| 5,623,666 A | 4/1997 | Pike | |
| 5,642,337 A | 6/1997 | Oskay | |
| 5,644,714 A | 7/1997 | Kikinis | |
| 5,644,766 A | 7/1997 | Coy | |
| 5,668,592 A | 9/1997 | Spaulding | |
| 5,668,788 A | 9/1997 | Allison | |
| 5,684,716 A | 11/1997 | Freeman | |
| 5,689,641 A * | 11/1997 | Ludwig et al. | 709/241 |
| 5,691,778 A | 11/1997 | Song | |
| 5,697,844 A | 12/1997 | Von Kohorn | |
| 5,703,795 A | 12/1997 | Mankowitz | |
| 5,708,811 A | 1/1998 | Arendt | |
| 5,712,976 A | 1/1998 | Falcon | |
| 5,715,416 A * | 2/1998 | Baker | 715/839 |
| 5,726,909 A | 3/1998 | Krikorian | |
| 5,734,719 A | 3/1998 | Tsevdos | |
| 5,734,961 A | 3/1998 | Castille | |
| 5,748,468 A * | 5/1998 | Notenboom et al. | 700/3 |
| 5,761,655 A | 6/1998 | Hoffman | |
| 5,762,552 A | 6/1998 | Vuong | |
| 5,774,668 A | 6/1998 | Choqiuer | |
| 5,774,672 A | 6/1998 | Funahashi | |
| 5,781,889 A | 7/1998 | Martin et al. | |
| 5,790,172 A | 8/1998 | Imanaka | |
| 5,790,671 A | 8/1998 | Cooper | |
| 5,790,856 A | 8/1998 | Lillich | |
| 5,793,980 A | 8/1998 | Glaser | |
| 5,798,785 A | 8/1998 | Hendricks | |
| 5,802,599 A | 9/1998 | Cabrera | |
| 5,808,224 A | 9/1998 | Kato | |
| 5,809,246 A | 9/1998 | Goldman | |
| 5,832,287 A | 11/1998 | Atalla | |
| 5,835,843 A | 11/1998 | Haddad | |
| 5,845,104 A | 12/1998 | Rao | |
| 5,848,398 A | 12/1998 | Martin | |
| 5,854,887 A | 12/1998 | Kindell | |
| 5,862,324 A | 1/1999 | Collins | |
| 5,864,870 A | 1/1999 | Guck | |
| 5,867,714 A | 2/1999 | Todd | |
| 5,884,028 A | 3/1999 | Kindell | |
| 5,884,298 A | 3/1999 | Smith | |
| 5,887,193 A | 3/1999 | Takahashi | |
| 5,913,040 A | 6/1999 | Rakavy | |
| 5,915,094 A | 6/1999 | Kouloheris | |

| | | | |
|---|---|---|---|
| 5,915,238 A | 6/1999 | Tjaden |
| 5,917,537 A | 6/1999 | Lightfoot |
| 5,917,835 A | 6/1999 | Barrett |
| 5,923,885 A | 7/1999 | Johnson |
| 5,930,765 A | 7/1999 | Martin |
| 5,931,908 A | 8/1999 | Gerba |
| 5,949,688 A | 9/1999 | Montoya |
| 5,959,869 A | 9/1999 | Miller |
| 5,959,945 A | 9/1999 | Kleiman |
| 5,966,495 A | 10/1999 | Takahashi |
| 5,978,855 A | 11/1999 | Metz |
| 6,002,720 A | 12/1999 | Yurt |
| 6,009,274 A | 12/1999 | Fletcher |
| 6,018,337 A | 1/2000 | Peters |
| 6,018,726 A | 1/2000 | Tsumura |
| 6,072,982 A | 6/2000 | Haddad |
| 6,151,634 A | 11/2000 | Glaser |

FOREIGN PATENT DOCUMENTS

| | | |
|---|---|---|
| DE | A3820835 | 1/1989 |
| EP | A0082077 | 6/1983 |
| EP | 0140593 A2 | 5/1985 |
| EP | 0283304 | 9/1988 |
| EP | A0283350 | 9/1988 |
| EP | 0 309 298 | 3/1989 |
| EP | A0313359 | 4/1989 |
| EP | 0340787 | 11/1989 |
| EP | 0363186 | 4/1990 |
| EP | 0 425 168 A | 5/1991 |
| EP | 0464562 A2 | 1/1992 |
| EP | 0480558 | 4/1992 |
| EP | 0498130 | 8/1992 |
| EP | 0498130 A2 | 8/1992 |
| EP | 0 507 110 | 10/1992 |
| EP | A0631283 | 12/1994 |
| EP | 0632371 | 1/1995 |
| EP | 0817103 | 1/1998 |
| EP | 0841616 A2 | 5/1998 |
| EP | 0919964 | 6/1999 |
| EP | 0959570 A1 | 11/1999 |
| FR | A2602352 | 2/1988 |
| GB | A 2122799 | 1/1984 |
| GB | 2166328 A | 4/1986 |
| GB | 2193420 | 2/1988 |
| GB | A 2193420 | 2/1988 |
| GB | 2 238680 A | 6/1991 |
| GB | 2259398 | 3/1993 |
| GB | A2259398 | 3/1993 |
| GB | 2262170 A | 6/1993 |
| JP | 57-173207 | 10/1982 |
| JP | 07281682 | 10/1995 |
| JP | 08-279235 | 10/1996 |
| JP | 10-098344 | 4/1998 |
| WO | WO 86 01326 A | 2/1986 |
| WO | A9007843 | 7/1990 |
| WO | WO 91/08542 | 6/1991 |
| WO | A 9120082 | 12/1991 |
| WO | WO 93/16557 | 8/1993 |
| WO | A 9318465 | 9/1993 |
| WO | A94 03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96 12258 A | 4/1996 |
| WO | WO 98/45835 | 10/1998 |
| WO | WO 01/00290 | 1/2001 |

OTHER PUBLICATIONS

Bonczck, Robert H. et al, "The DSS Development System", 1983 National Computer Conference, Anaheim, California, May 16-19, 1983, pp. 441-455.
IBM Technical Disclosure Bulletin, vol. 30, No. 5, Oct. 1987, "Method for Automated Assembly of Software Versions", pp. 353-355.
"Robotic Wafer Handling System for Class 10 Environments" IBM Technical Disclosure Bulletin, vol. 32, No. 9A, Feb. 1990, pp. 141-143.
"Darts Revolution Again", Replay Magazine, Mar. 1991, pp. 146-148.
Galen A. Grimes, "Chapter 18, Taking Advantage or Web-based Audio."
Petri Koskelainem "Report on Streamworks™".
W. Richard Stevens, "TCP/IP Illustrated: vol. 1, the Protocols".
Nowell Outlaw "Virtual Servers Offer Performance benefits for Networks Imaging".

* cited by examiner

INTELLIGENT DIGITAL AUDIOVISUAL PLAYBACK SYSTEM

CROSS-REFERENCE TO RELATED APPLICATIONS

This application is related to our copending commonly assigned applications:

U.S. Ser. No. 08/817,690 (Corres. to PCT/FR94/01185 filed Oct. 12, 1994);
U.S. Ser. No. 08/817,528 (Corres. to PCT/FR95/01334 filed Oct. 12, 1995)
U.S. Ser. No. 08/817,968 (Corres. to PCT/FR95/01335 filed Oct. 12, 1995)
U.S. Ser. No. 08/817,437 (Corres. to PCT/FR95/01336 filed Oct. 12, 1995)
U.S. Ser. No. 08/817,426 (Corres. to PCT/FR95/01337 filed Oct. 12, 1995)
U.S. Ser. No. 08/817,438 (Corres. to PCT/FR95/01338 filed Oct. 12, 1995)

BACKGROUND OF THE INVENTION

Field of the Invention

The invention relates to a payment-triggered audiovisual reproduction system.

These audiovisual reproduction systems are generally found in cafes or pubs. This type of system is composed of a sound reproduction machine usually called a jukebox linked to a monitor which displays video images or video clips. To do this the jukebox is equipped with a compact video disk player and a compact video disk library and includes selection buttons which locate the titles of pieces of music which are available. Payment of a proper fee followed by one or more selections authorizes activation of the system with automatic loading in the player of the disk on which the selected piece is found, the desired audiovisual reproduction then being able to start.

These systems, although allowing faithful and good quality reproduction, nevertheless have major defects. Thus, a first defect relates to the space necessary for storing the library; this consequently entails that the system will have large dimensions and will be bulky. Likewise these systems which call on mostly mechanical material using sophisticated techniques have high fault rates; this is another defect. Finally, it is very unusual for all the pieces on a disk to be regularly heard; some are almost never played, but still cannot be eliminated. Besides this defect, the following problem is caused by the companies, which manage and distribute these systems, placing in the circuit a limited number of identical disks and imposing a certain rotation on their customers; this sometimes entails an unpleasant wait for the customers when a disk is not available.

In addition, patent application PCT/WO 93 18465 discloses computerized jukeboxes which allow reception via a telecommunications network and a modem connecting the jukeboxes to the network digital data comprising remotely loaded songs or musical pieces in a mass storage of the jukeboxes. The communications system is likewise used for remote loading of representative files of digitized graphics information, the songs and graphics files being compressed before they are sent over the network. The jukebox processor then uses these files by decompressing them and sending the graphics data to the video circuit and the song data to the audio circuit.

However, the processor also manages the man/machine interface and management of these different elements is done by sequentially displaying the graphics images representative of the song, then by responding to the touch action of the user, then checking that the user has paid the prescribed amounts, and finally when the required amount has been accounted, placing the selection in a queue for its subsequent execution. Otherwise this system can only operate by first displaying the graphics images and then starting performance of the song because the processor cannot, according to the flowcharts, execute two tasks at one time. Finally, the graphics representations are uniquely data of the album cover of the song digitized by a scanner table. In no case does this jukebox allow display of moving images during the broadcast of the song or music. Likewise, since the processor is used for digital data decompression and processing for conversion into audio signals, it cannot consider the new actions of a user making a new selection. This is apparent, notably on page 12 of the PCT application lines, 25 to 27. Selection of new songs can only be done when the jukebox is in the attraction mode, i.e, in the one in which it displays graphics representations of different songs stored in the jukebox in succession.

U.S. Pat. No. 4,956,768 discloses a broadband server for transmitting music or images formed by a main processor communicating by a DMA channel with a hard disk and output cards each controlled by a supplementary local processor which manages an alternative mode of access to two buffer memories A and B, of which one, A, is used to deliver for example musical data to a user, while the other is filled. Each of the output cards is connected to a consultation station which can be local and situated in the same vicinity as the server or at a distance and connected by an audio or video communications network. The server receives data block-by-block and ensures that the sample parities are correct and rejects a block including more than two successive wrong samples. Each of these blocks is of course designated by a number. Once a block has been accepted, it can be stored on the local hard disk by recording its ordinal number which has no relation to its physical address on the hard disk. The consultation stations have audio and video outputs such as loudspeakers or headphones and a television monitor which makes it possible to listen to music or display images in response to requests received from terminals included in the consultation stations. In this system the consultation stations where the first communications processor must have specific software for management of selection requests for musical pieces or video [sic]. It is only when the request has been made and addressed to the broadband server processor that it can transfer, under the authority of the local processor, the data in the buffer memories such that this local processor ensures that the data are sent to the consultation stations. Moreover, it is added that the output cards and buffer memories are filled only after having received the authorization of the local processor of the card.

Consequently, this system can only function within the framework of a multiprocessor device and does not in any way suggest use of this server for a jukebox controlled by a single processor operating in an multitask environment. This system proposed by the U.S. patent thus implements a complex facility which allows delivery of a service to several consultation stations; this complex facility is thus costly and incompatible with a system of jukeboxes, of which the cost price should be as low as possible.

The object of the invention is to eliminate the various aforementioned defects of the systems of the prior art and it proposes an intelligent digital audiovisual system which allows display of moving images while musical pieces and songs are being played with high reproduction quality as well as possibilities of remote loading without greatly burdening the budget of this apparatus.

This object is achieved by the payment-based audiovisual reproduction system, developed around a microprocessor device linked to a payment device, on the one hand comprising fundamentally mass storage means, for among others storage, in compressed digital form, of the audio and visual information to be used, and on the other hand linked, via interfaces, to digital display means and digital audio reproduction means allowing formation of a multimedia environment, being characterized in that the ensemble is managed by a multitask operating system including a library of tools and services integrated in the storage means, the kernel of the operating system linking to each of the peripheral means a task and assigning the highest priority to the display task and a second level priority to the audio task, at least one temporary storage buffer of the data to be decompressed being linked to the respective display and audio reproduction means to allow processing of data transferred to one of the means during processing of a transfer to another means by the operating system, and a scheduling module of the operating system linking a status buffer positioned at a value representative of the activity of a task while the temporary storage buffers contain the data.

According to another feature, the audiovisual reproduction system is moreover linked via an interface to a telecommunications modem, said system then being connected to a audiovisual data distribution system by the telecommunications modem and telecommunications lines, this telecommunications function likewise being managed by the multitask operating system included in the library of tools and services integrated in the storage means with third level priority and linking to this telecommunications task a temporary buffer for storage of data to be transferred and a buffer for indicating the status of this task.

According to another feature the operating system includes a priority resolution module which, depending on the priorities assigned to the declared tasks, will acknowledge reception of the request for a task or will respond with a busy signal, and a scheduling module which depending on the declared active tasks and the availability of sufficient hardware resources fills a storage request queue.

According to another feature the temporary buffer for storage of data from a man/machine interface and a buffer which indicates the status of this task of the man/machine interface are linked to an interface task such as selection of zones on a touch screen, each zone corresponding to a choice among the data displayed on the display means.

According to another feature, the lowest priority task is that of management by the manager, based on a remote control with use validated by a key switch, for managing the data base for acquiring new selections or all types of command settings by remote control.

According to another feature it includes a system operating status file kept on the hard disk, in which the system records data on the insertion of money, addition of a selection in the queue, the end of a selection to pass to the following selection to allow the system to return to exactly the same location in case of an interruption due to a fault.

According to another feature the display means include basically a video monitor for reproduction of images of the audiovisual information and a touch screen for monitoring and assistance on which at least four control panels can be selected, the first title selection panel proceeding to help customers find and select a desired title, a second management control panel for control of volume, basses, trebles or panoramic control on the video monitor, a third panel for scanning the title database, for private use, to allow the system manager or owner to examine the database containing the available titles via the audiovisual data distribution network to control and retrieve said titles, a fourth statistics panel, for private use, for statistical estimations and calculations relative to the titles.

According to another feature the infrared remote control device allows execution of at least one of the functions listed below:
  audio volume control of the played selections,
  audio volume control of an auxiliary played source,
  microphone start-stop command,
  microphone audio volume control,
  balance control, left channel, right channel,
  control of base frequency level,
  control of treble frequency level,
  commands to cancel or skip a musical selection,
  panoramic effects command, zoom forward, zoom back,
  triggering of reset of the software program.

According to another feature a management mode module allows recording of the operating parameters of the system in a file stored in the hard disk in a machine format which cannot be read by the user, the data backed up on the disk being reread each time the system is activated.

According to another feature, the system operating parameters file makes it possible to fix the price of a title or number of titles for a predetermined value, the inactivity delay before starting the visual promotional mode, the inactivity delay before starting an auxiliary source such as a radio for example, the inactivity delay before starting the selection sampling mode, the location determined in seconds from the beginning where the system will be able to start sampling a selection, and the duration in seconds of the sample.

Other advantages and features of the invention follow from the following description, with reference to the attached drawings, given by way of example but not limited to one embodiment of the invention, in which.

Figure 1:
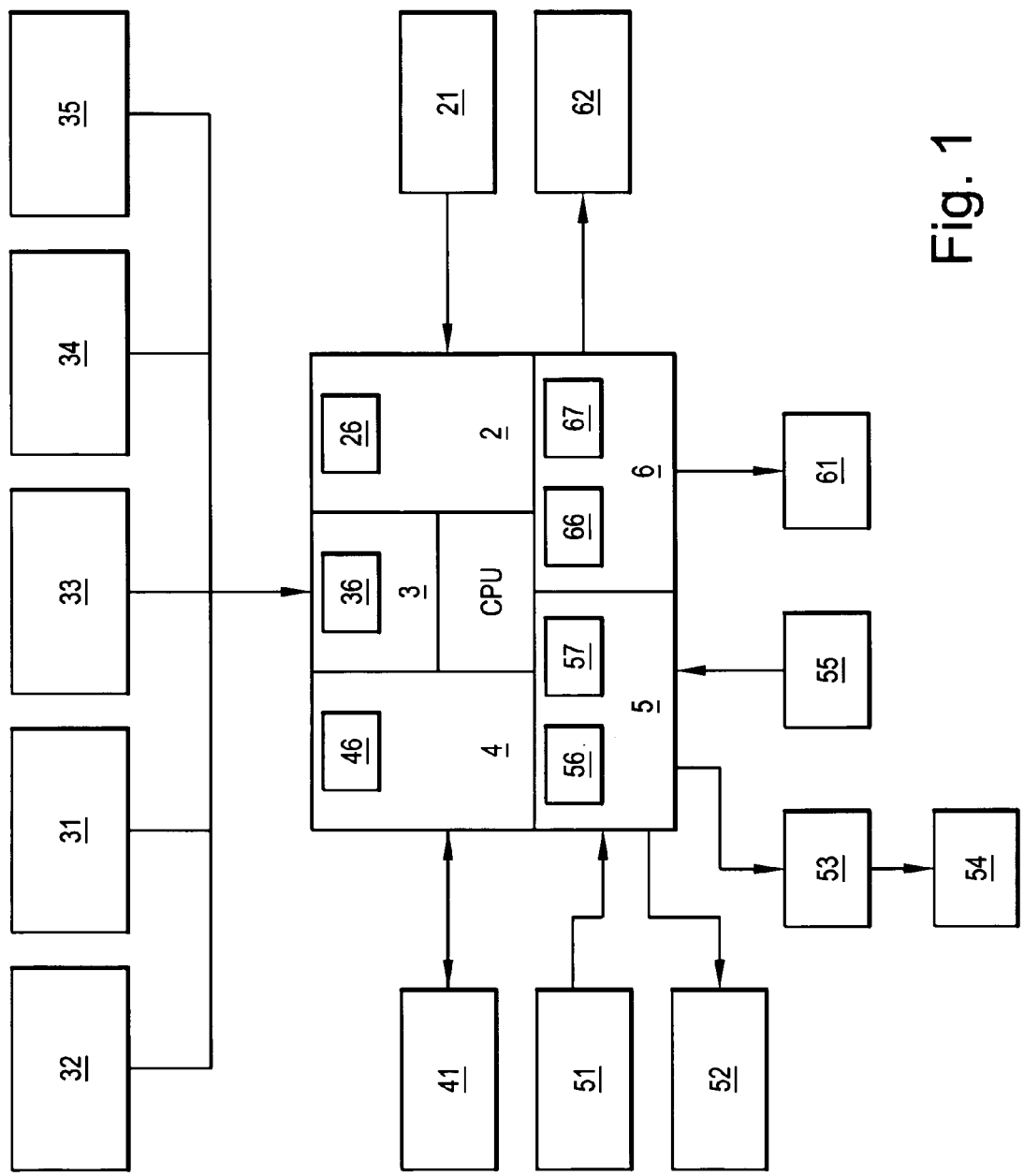
FIG. 1 shows a circuit diagram of the hardware comprising the invention.

Preferably, but in a nonrestrictive manner, the audiovisual reproduction system uses the aforementioned listed components.

Microprocessor central unit 1 is a high performance PC-compatible system, the choice for the embodiment having fallen on an Intel 80486 DX/2 system which has storage means and the following characteristics.
  compatibility with the local Vesa bus,
  processor cache memory: 256 kO,
  RAM of 32 MO
  high performance parallel and serial ports,
  SVGA microprocessor graphics adapter,
  type SCSI/2 bus type controller,
  battery backed-up static RAM Any other central unit with equivalent or superior performance can be used in the invention.

This central unit controls and manages audio control circuit (5), telecommunications control circuit (4), input control circuit (3), mass storage control circuit (2), and display means control circuit (6). The display means consist essentially of 14 inch (35.56 cm) flat screen video monitor (62) without interleaving of the SVGA type, with high resolution and low radiation, which is used for video reproduction (for example, the covers of the albums of the musical selections), graphics or video clips.

Mass storage means (21) using high speed and high capacity SCSI type hard disks are connected to the storage means already present in the microprocessor device. These modules allow storage of digitized and compressed audio-visual data.

High speed 28.8 k/bps telecommunications modem adapter (41) is integrated to authorize connection to the audiovisual data distribution network controlled by a central server.

To reproduce the audio data of the musical selections, the system includes loudspeakers (54) which receive the signal from amplifier-tuner (53) connected to electronic circuit (5) of the music synthesizer type provided to support a large number of input sources while providing an output with CD (compact disk) type quality, such as for example a microprocessor multimedia audio adapter of the "Sound Blaster" card type SBP32AWE from Creative Labs Inc. on which two buffer memories (56, 57) are added for a purpose to be explained below.

Likewise the control circuit of the display means includes two buffer memories (66, 67) for a purpose to be explained below.

A thermally controlled 240 watt ventilated power supply provides power to the system. This power supply is protected against surges and harmonics.

The audiovisual reproduction system manages via its input controller circuit (3) 14 inch (35.56 cm) touch screen "Intelli Touch" (33) from Elo Touch Systems Inc. which includes a glass coated board using "advanced surface wave technology" and an AT type bus controller. This touch screen allows, after having displayed on video monitor (62) or television screen (61) various selection data used by the customers, management command and control information used by the system manager or owner. It is likewise used for maintenance purposes in combination with external keyboard (34) which can be connected to the system which has a keyboard connector for this purpose, controlled by key lock (32) via interface circuit (3).

Input circuit (3) likewise interfaces with the system remote control set (31) composed for example of:
- an infrared remote control from Mind Path Technologies Inc., an emitter which has 15 control keys for the microprocessor system and 8 control keys for the projection device.
- an infrared receiver with serial adapter from Mind Path Technologies Inc.

Fee payment device (35) from National Rejectors Inc. is likewise connected to input interface circuit (3). It is also possible to use any other device which allows receipt of any type of payment by coins, bills, tokens, magnetic chip cards or a combination of means of payment.

To house the system a chassis or frame of steel with external customizable fittings is also provided.

Besides these components, wireless microphone (55) is connected to audio controller (5); this allows conversion of the latter into a powerful public address system or possibly a karaoke machine. Likewise a wireless loudspeaker system can be used by the system.

Remote control set (31) allows the manager, for example from behind the bar, access to and control of various commands such as:
- microphone start/stop command,
- loudspeaker muting command,
- audio volume control command;
- command to cancel the musical selection being played.

Two buffers (56, 57) are connected to audio controller circuit (5) to allow each to store information corresponding to a quarter of a second of sound in alternation. Likewise two buffers (66, 67) are linked to video controller circuit (6), each able to store a tenth of a second of video each alternately. Finally, respective buffer (46, 36, 26) is connected to each of the circuits of communications controller (4), input interface (3) and storage interface (2).

The system operating software has been developed around a library of tools and services largely oriented to the audiovisual domain in a multimedia environment. This library advantageously includes an efficient multitask operating system which efficiently authorizes simultaneous execution of multiple fragments of code. This operating software thus allows concurrent execution, in an orderly manner and avoiding any conflict, of operations performed on the display means, audio reproduction means as well as management of the telecommunications lines via the distribution network. In addition, the software has high flexibility.

The digitized and compressed audiovisual data are stored in storage means (21).

Each selection is available according to two digitized formats: hi-fi and CD quality.

Figure 2:
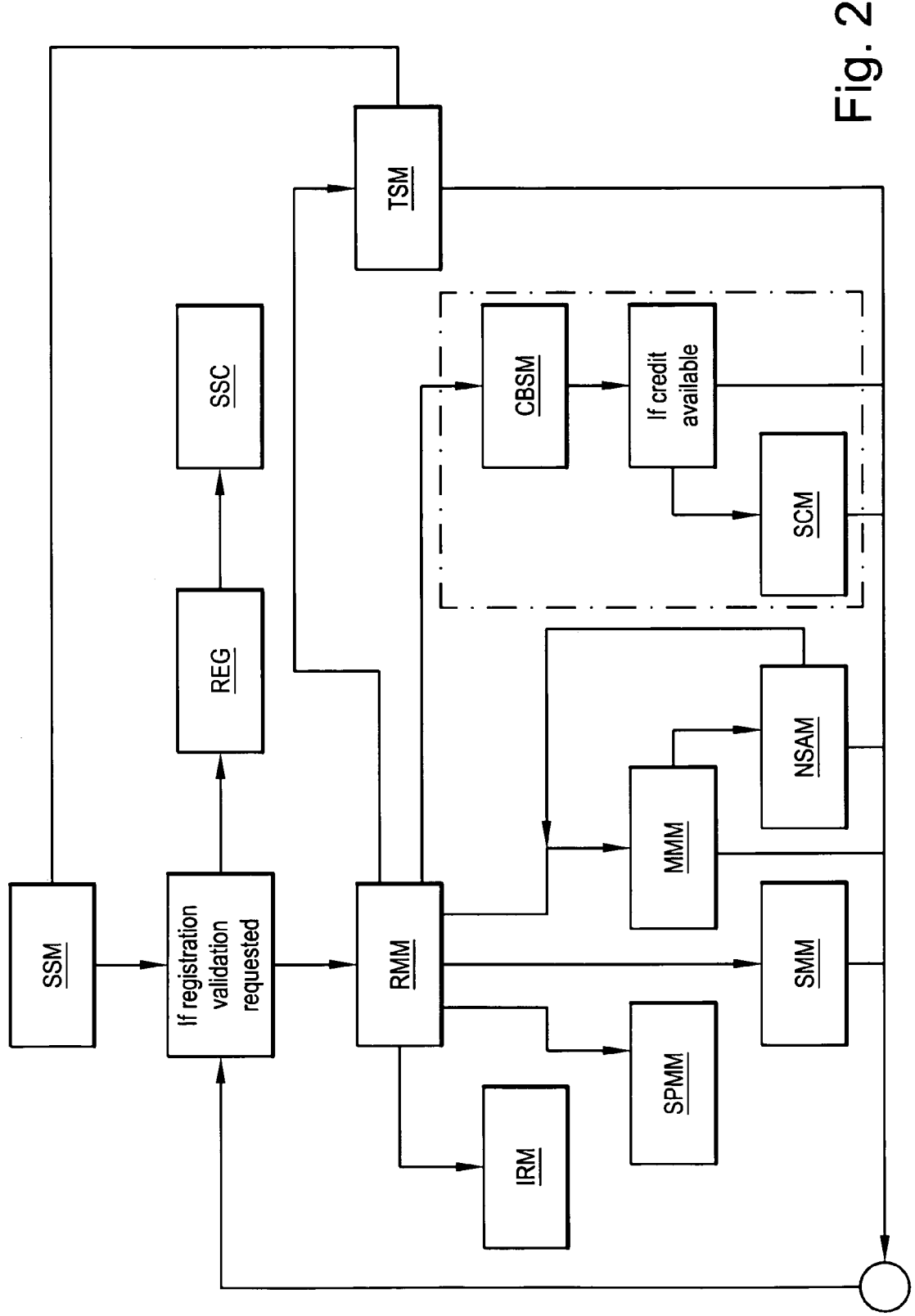
FIG. 2 shows an organizational chart of the service modules specific to a task and managed via a multitask operating system, the set of modules being included in a library stored in the storage means.

Prior to describing and reading this organizational chart in FIG. 2, it must be noted that while all these modules described separately seem to be used sequentially, in reality the specific tasks of these modules are executed simultaneously in an environment using the multitask operating system. Consequently the organizational chart indicates the specific operations which the module must perform and not a branch toward this module which would invalidate all the operations performed by the other modules.

The first module, labeled SSM, is the system startup module. This module does only one thing, consequently it is loaded automatically when the system is powered up. If the system is started with a correct registration number it then directly enters the "in service" mode of the module labeled RRM.

The REG module is the registration mode module which, when it is activated for the first time or when approval for a new registration is necessary, indicates its software serial number and requests that the user enter his coordinates, such as the name of the establishment, address and telephone number.

The RMM module is the module of the "in service" mode which is the mode of operation which the system enters when its registration number has been validated. In this mode the system is ready to handle any request which can be triggered by various predefined events such as:
- customers touching the screen: when a customer or user touches the screen, the system transfers control of the foreground session to the of the customer browsing and selection mode CBSM module,
- telecommunications network server call requests: when the system detects a loop on the phone line, it broadcasts an asynchronous background procedure: the telecommunications services mode of the TSM module, requests concerning key switch (32): when the manager turns the key switch the system hands over control of its foreground session to the management mode SMM module, reception of a remote control signal: when a command is received, it is processed in a background session by the system command SMM module while the foreground session remains available for other interventions, appearance of end of timing, showing inactivity of the system: when one of the various timers is activated, control is temporarily handed over to the inactivity routines IRM module for processing.

The system remains in the "in service" mode until one of the above described events takes place.

The IRM module is the inactivity routines module. It contains the routines which perform predetermined functions such as album cover display, broadcast of parts of musical pieces present in the system, reproduction of complete selections for internal promotional proposes, audio reproductions for external promotional purposes, promotional spoken announcements of new musical selections, withdrawal to an auxiliary source which can be called when the system is inactive and when a predefined but adjustable time interval corresponding to a timer has expired.

The SCM module is the system commands module. This module allows execution of functions which command the system to accept a required input by an infrared remote control device, these functions being handled instantaneously without the process underway being stopped. A very large number of these functions are possible, only some are listed below, in a nonrestrictive manner:

audio volume control of the played selections,
audio volume control of the auxiliary played source,
microphone start/stop command,
microphone audio volume control,
balance control, left channel, right channel,
control of base frequency level,
control of treble frequency level,
command to cancel or skip a musical selection,
panoramic effects command, zoom forward, zoom back,
triggering of reset of the software program.

The MMM module is the management mode module. This module is triggered when the key switch is turned by the manager. The display of an ordinary screen is replaced by a display specific to system management and system operating parameters. Using this screen, system operating parameters such as the following can be controlled:

"master volume" level;
jukebox volume level;
auxiliary input (radio) volume level;
microphone volume level;
base level;
treble level;
title price for a predetermined value;
inactivity delay before starting the visual promotion mode;
inactivity delay before starting the auxiliary source (radio);
inactivity delay before starting the selection sampling mode;
the location (in seconds from the beginning) where to start sampling;
sample duration (in seconds).

All the values set using this control screen are backed up on disk and reread whenever the system is started.

The file containing the control values on disk is in a non-readable machine format. The file occupies only 128 octets of disk space in all.

With this new display the manager can control all the settings which are possible with remote control. He can likewise take control of additional low level commands allowing for example definition of commands to be validated or invalidated on the remote control. He is also able to define a maximum of high and low levels for each system output source, these limits defining the range available on the remote control. Using this screen the manager can access the mode of new selection acquisitions by touching a button located on the touch screen which initiates execution of the NSAM statistics module. When the manager has succeeded in defining these commands as well as the system configuration, it is then enough to remove the key and the system returns automatically to the "in service" mode.

The NSAM module is the new selections acquisition mode module.

The CBSM module is the customer browsing and selection mode module. Access to this module is triggered from the "in service" mode when the customer touches the screen. The display allows the user to view a menu provided for powerful browsing assisted by digitized voice messages to guide the user in his choice of musical selections.

The TSM module is the telecommunications services mode module between the central server and the audiovisual reproduction system. The module allows management of all management services available on the distribution network. All the tasks specific to telecommunications are managed like the background tasks of the system. These tasks always use only the processing time remaining once the system has completed all its foreground tasks. Thus, when the system is busy with one of its higher priority tasks, the telecommunications tasks automatically will try to reduce the limitations on system resources and recover all the microprocessor processing time left available.

The SSC module is the system security control module. This module manages security, each system is linked to a local controller system according to a preestablished time pattern for acquisition of the approval signal in the form of the registration number authorizing it to operate. In addition, if cheating has been detected or the system cannot communicate via the network, said system automatically stops working.

The SPMM module allows management of musical selections, songs or video queued by the system for execution in the order of selection.

Finally the SMM module allows remote management of system settings by the manager by remote control.

The multitask operating system comprises the essential component for allowing simultaneous execution of multiple code fragments and for managing priorities between the various tasks which arise.

Figure 3:
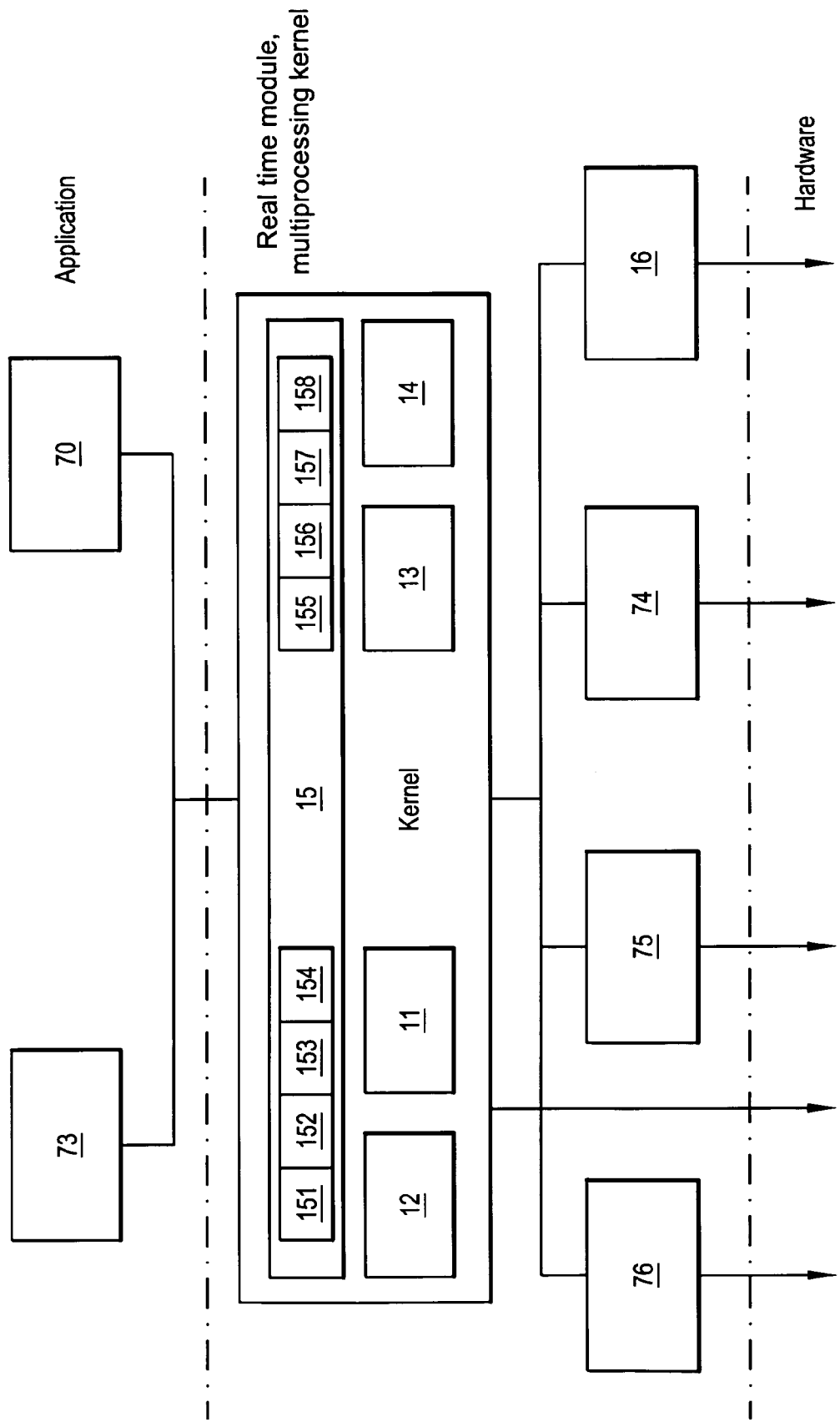
FIG. 3 shows the organization of the multitask system which manages the set of hardware and software.

This multitask operating system is organized as shown in FIG. 3 around a kernel comprising module (11) for resolving priorities between tasks, task scheduling module (12), module (13) for serialization of hardware used, and process communications module (14). Each of the modules communicates with application programming interfaces (15) and database (16). There are as many programming interfaces as there are applications. Thus, module (15) includes first programming interface (151) for key switch (32), second programming interface (152) for remote control (31), third programming interface (153) for touch screen (33), fourth programming interface (154) for keyboard (34), fifth programming interface (155) for payment device (35), sixth programming interface (156) for audio control circuit (5), seventh programming interface (157) for video control circuit (6), and last interface (158) for telecommunications control circuit (4).

Five tasks with a decreasing order of priority are managed by the kernel of the operating system, the first (76) for the video inputs/outputs has the highest priority, the second (75) of level two relates to audio, the third (74) of level three to telecommunications, the fourth (73) of level four to interfaces and the fifth (70) of level five to management. These orders of priority will be considered by priority resolution module (11) as and when a task appears and disappears. Thus, as soon as a video task appears, the other tasks underway are suspended, priority is given to this task and all the system resources are assigned to the video task. At the output, video task (76) is designed to unload the video files of the mass memory (21) alternately to one of two buffers (66, 67), while other buffer (67 or 66) is used by video controller circuit (6) to produce the display after data decompression. At the input, video task (76) is designed to transfer data received in telecommunications buffer (46) to mass storage (21). It is the same for audio task (75) on the one hand at the input between telecommunications buffer (46) and buffer (26) of mass memory (21) and on the other hand at the output between buffer (26) of mass memory (21) and one of two buffers (56, 57) of audio controller circuit (5).

Figure 4:
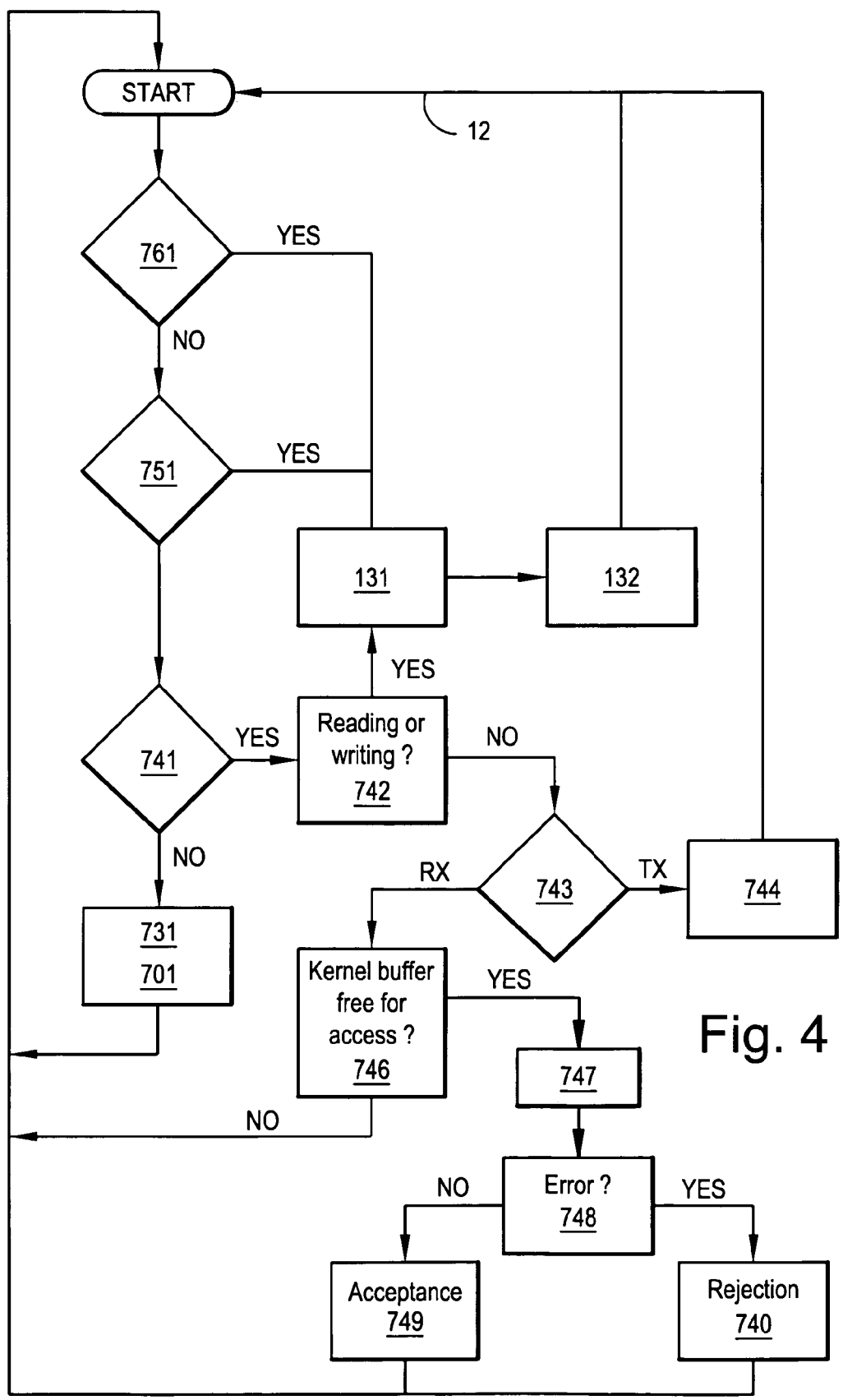
FIG. 4 shows a flowchart describing the operation of the multitask management system.

Task scheduling module (12) will now be described in conjunction with FIG. 4. In the order of priority this module performs first test (761) to determine if the video task is active, i.e, if one of video buffers (66, 67) is empty. In the case of a negative response the task scheduling module passes to the following test which is second test (751) to determine if the audio task is active, i.e, if one of video buffers (56, 57) is empty. In the case of a negative response third test (741) determines if the communication task is active, i.e., if buffer (46) is empty. After a positive response to one of the tests, task scheduling module (12) at stage (131) fills memory request acccess queue (13) and at stage (132) executes this request by reading or writing between mass storage (21) and the buffer corresponding to the active task, then loops back to the first test.

When test (741) on communications activity is affirmative, scheduler (12) performs test (742) to determine if it is a matter of reading or writing data in the memory. If yes, the read or write request is placed in a queue at stage (131). In the opposite case, the scheduler determines at stage (743) if it is transmission or reception and in the case of transmission sends by stage (744) a block of data to the central server. In the case of reception the scheduler verifies at stage (746) that the kernel buffers are free for access and in the affirmative sends a message to the central server to accept reception of a data block at stage (747). After receiving a block, error control (748) of the cyclic redundancy check type (CRC) is executed. The block is rejected at stage (740) in case of error, or accepted in the opposite case at stage (749) by sending a message corresponding to the central server indicating that the block bearing a specific number is rejected or accepted, then loops back to the start tests. When there is no higher level task active, at stage (731 or 701) the scheduler processes interface or management tasks.

Figure 5:
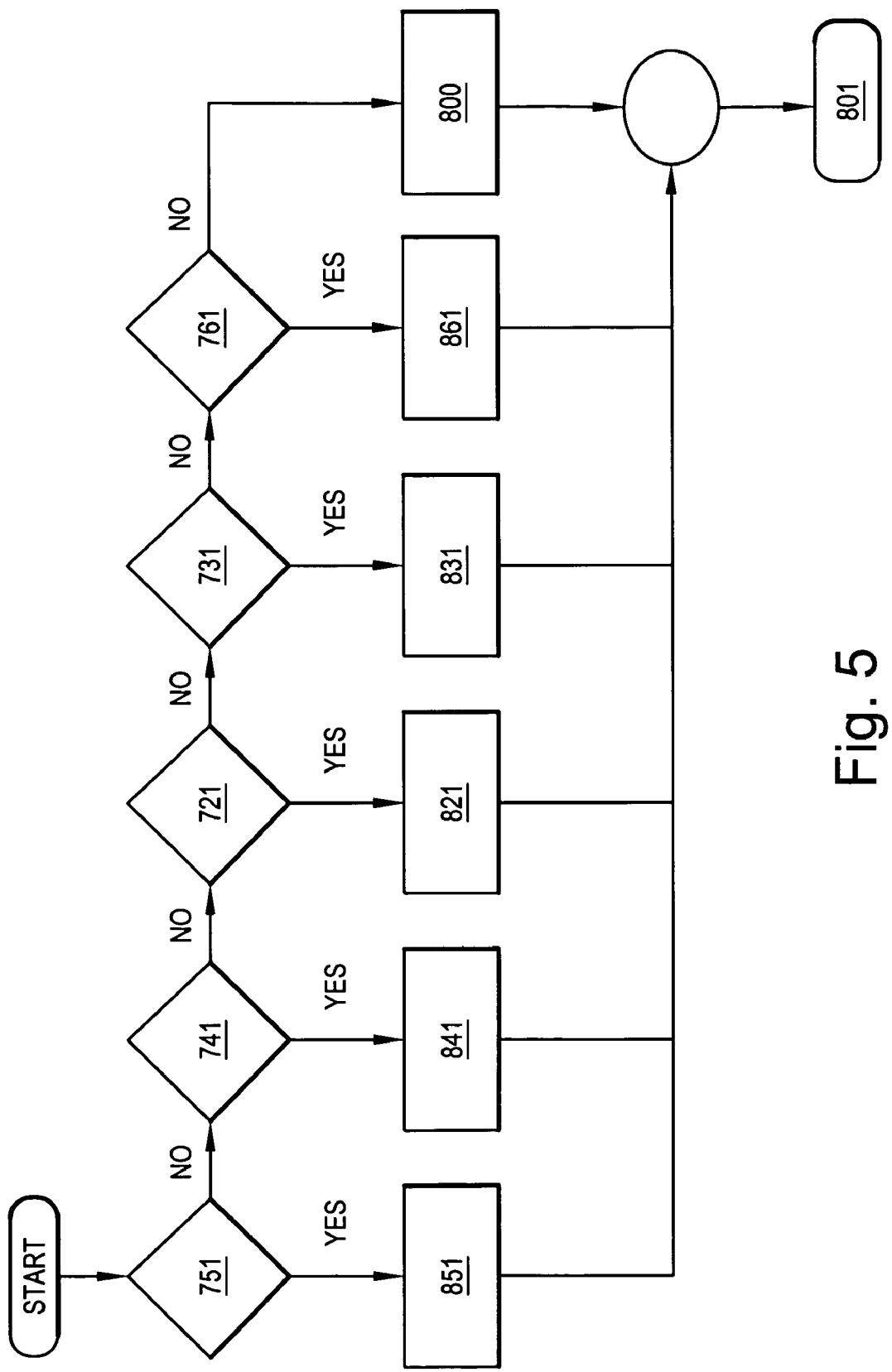
FIG. 5 shows a flowchart for verifying task activity.

Detection of an active task or ready task is done as shown in FIG. 5 by a test respectively (721 to 761) on each of the respective hardware or software buffers (26) of the hard disk, (36) of the interface, (46) of telecommunications, (56 and 57) of audio, (66 and 67) of video which are linked to each of respective controller circuits (2, 3, 4, 5, 6) of each of the hardware devices linked to central unit (1). If one or more of these buffers are filled with data, scheduler (12) positions the respective status buffer or buffers (821) for the hard disk, (831) for the interface, (841) for telecommunications, (851) for audio, (861) for video corresponding to the material at a logic state indicative of the activity. In the opposite case the scheduler status buffers are returned at stage (800) to a value indicative of inactivity.

The system operating status is kept on hard disk.

Each time a notable event is triggered, the system immediately records it on hard disk.

Thus, in the case in which an electrical fault or hardware failure occurs, the system will accordingly restart exactly at the same location where it had been interrupted.

Events which trigger back-up of the operating status are:
insertion of money (crediting);
addition of a selection to the queue;
end of a selection (change from the selection currently being played).

The file is then in a machine format which can only be read by the unit and does not occupy more than 64 octets.

Figure 6:
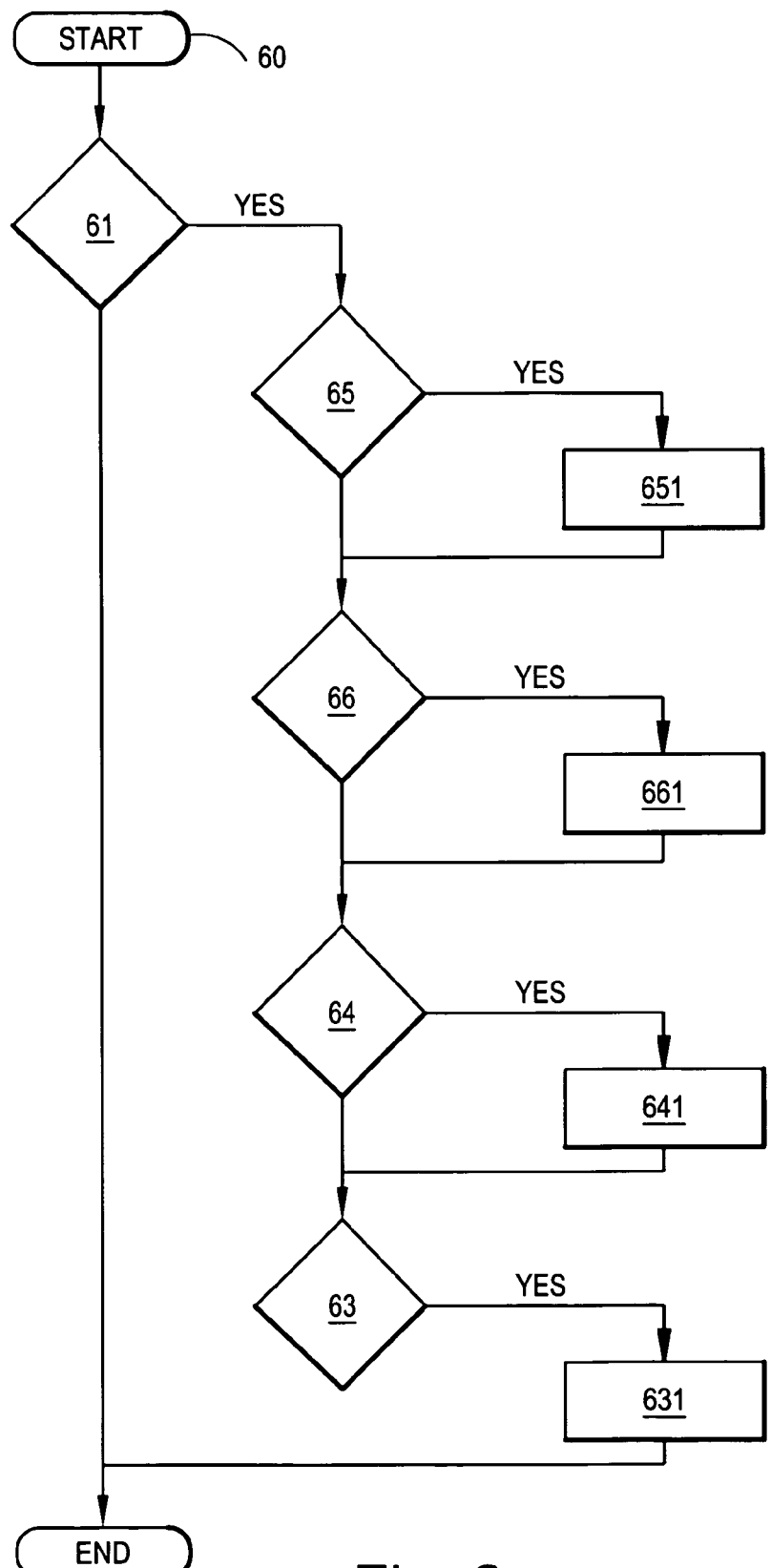
FIG. 6 shows the flowchart of selection queuing.

The number and type of active tasks is indicated to scheduler (12) by execution of the selection management module SPMM whose flowchart is shown in FIG. 6. The management exercised by this module begins with test (61) to determine if selections are in the queue.

Consequently, if test (61) on the queue determines that selections are waiting, when a customer chooses a title he wishes to hear, it is automatically written in a queue file of the system on hard disk.

Thus, no selection made will ever be lost in case of an electrical failure. The system plays (reproduces) the selection in its entirety before removing it from the queue file.

When the selection has been reproduced in it entirety, it is removed from the queue file and written in the system statistics file with the data and time of purchase as well as the data and time at which it was performed.

Immediately after transfer of the completed selection to the statistics file, the system checks if there are others in the queue file. If there is another, the system begins immediately to play the selection.

The total time transpired between the end of one selection and the start of the next is less than 0.5 seconds.

This delay can be prolonged using a button on the system control board.

Processing is continued by test (65) to determine if the selection contains an audio scenario. If yes, at stage (651) this scenario is written in the task queue of scheduler (12), If not, or after this entry, processing is continued by test (66) to determine if the selection contains moving images. If yes, the video scenario is written at stage (661) in the task queue of scheduler (12). If no or if yes after this entry, processing is continued by test (64) to determine if the selection contains still graphics. If yes, at stage (641) this graphic presentation scenario is written in the task queue of scheduler (12). If no or if yes after this entry, processing is continued by test (63) to determine if the selection contains an advertising scenario. If yes, at stage (631) the scenario is written in the queue of tasks of scheduler (12). Thus scheduler (12) notified of uncompleted tasks can manage the progression of tasks simultaneously.

Due, on the one hand, to the task management mode assigning highest priority to the video task, on the other hand, to the presence of hardware or software buffers assigned to each of the tasks for temporary storage of data and the presence of status buffers relative to each task, it has been possible to have all these tasks managed by a single central unit with a multitask operating system which allows video display, i.e., moving images compared to a graphic representation in which the data to be processed are less complex. This use of video presentation can likewise be done without adversely affecting audio processing by the fact that audio controller circuit (5) includes buffers large enough to store a quantity of compressed data sufficient to allow transfer of video data to one of video buffers (66, 67) during audio processing while waiting for the following transfer of audio data.

Moreover, the multitask operating system which includes a library containing a set of tools and services greatly facilitates operation by virtue of its integration in the storage means and the resulting high flexibility. In particular, for this reason it is possible to create a multimedia environment by simply and efficiently managing audio reproduction, video or graphics display and video animation. In addition, since the audiovisual data are digitized and stored in the storage means, much less space is used than for a traditional audiovisual reproduction system and consequently the congestion of the system according to the invention is clearly less.

Any modification by one skilled in the art is likewise part of the invention. Thus, regarding buffers, it should be remembered that they can be present either physically in the circuit to which they are assigned or implemented by software by reserving storage space in the system memory.

The invention claimed is:

1. A payment-based audiovisual reproduction system, comprising:
    a microprocessor linked to a payment device, and operating under the control of a multitasking operating system;
    a data store for storing audio and visual information in compressed form;
    a display operatively coupled to said data store;
    a digital audio reproducer coupled to said data store;
    a multitasking operating system for managing the formation of a multimedia environment, the operating system including a library of tools and services integrated in the data store, the operating system being arranged to associate a task with respective peripherals and assigning a first priority level to a display task and a second, lower priority level, to an audio task;
    at least two temporary buffers for storing video data and at least two buffers for storing audio data, said video and audio data being, respectively, retrieved from said data store, said temporary buffers transmitting said video and audio data respectively to the downstream display and audio reproducer through respective decompressors, the temporary buffers that store video data allowing the processing of the information transferred into a display buffer by a display control circuitry from one of the temporary buffers during video data transfer to the other temporary buffer by the operating system, the temporary buffers that store audio data allowing the processing of the information transferred into the reproduction buffer by an audio control circuitry from one of the temporary buffers during audio data transfer to the other temporary buffer by the operating system, said temporary buffers being associated with respective status buffers arranged to store state data representing respective activities relating to decompression tasks, said status buffers being provided for the temporary buffers that store video data and for the temporary buffers that store audio data, said respective status buffers being put into an active state if one of the two corresponding temporary buffers is empty, and if each of the corresponding temporary buffers contain data being put into an inactive state;
    a scheduling module for the operating system arranged to read said status values and to alternatively feed the video and audio buffers with said data, said scheduling module performing a test to determine the state of status buffers provided for the temporary buffers that store audio data if status buffers provided for the temporary buffers that store video data are in an inactive state, the audio buffer having a size sufficient for storing an amount of data to avoid any lack of data during audio operation by the audio reproducer, when the display task has been triggered based upon its priority level for transmitting video data to the video data buffer; and
    further comprising a system operating status file stored on a hard disk, said status including data relating to the insertion of money, addition of a selection to the queue, the end of a selection and data allowing the system to return to a specified location in case of an interruption caused by a fault.

2. A payment-based audiovisual reproduction system as set forth in claim 1, wherein said audiovisual reproduction system is linked, under control of the operating system, to an audiovisual data distribution system via a telecommunications network including a telecommunications modem and telecommunications lines.

3. A payment-based audiovisual reproduction system according to claim 1, wherein the operating system includes a priority resolution module and a scheduling module for filling a storage request queue.

4. A payment-based audiovisual reproduction system according to claim 1, further comprising a temporary buffer for storage of data from a man/machine interface, and a buffer that indicates the status of the task of the man/machine interface, including a selection of zones on a touch screen, each zone corresponding to a choice among the data displayed on the display.

5. A payment-based audiovisual reproduction system according to claim 1, wherein the lowest priority task is the task of management by a manager for managing the database for requiring new selections or implementing command settings by remote control.

6. A payment-based audiovisual reproduction system according to claim 1, wherein the display includes a video monitor for reproduction of images of the audiovisual information and a touch screen for monitoring and assistance on which at least four control panels can be selected, the first control panel for helping customers find and select a desired title, a second control panel for control of the volume, bass, treble or panoramic control of the video monitor, a third control panel for scanning the title database to allow the system manager or owner to examine the database containing the available titles via the audiovisual data distribution network to control and retrieve said titles, and a fourth control panel for providing statistical estimates and calculations relating to the titles.

7. A payment-based audiovisual reproduction system according to claim 1, further comprising a remote control device allowing at least one of audio volume control of the played selections, audio volume control of an auxiliary played source, a microphone start-stop command, a microphone audio volume control, balance control, control of base frequency level, control of treble frequency level, commands to cancel or skip a musical selection, panoramic effects command, including zoom forward and zoom back, and triggering of reset of the software program.

8. A payment-based audiovisual reproduction system according to claim 1, wherein a management mode module allows recording of system operating parameters in a file stored in a hard disk in a machine format that cannot be read by the user, the data being backed up on the disk and being reread each time the system is activated.

9. A payment-based audiovisual reproduction system according to claim 8, wherein the system operating parameters file enables fixing the price of a title or number of titles for a predetermined value, the inactivity delay before starting a visual promotional mode, the inactivity delay before starting an auxiliary source, the inactivity delay before starting a selection sampling mode, the location, determined in seconds from the beginning, where the system will be able to start sampling a selection, and the duration in seconds of the sample.

* * * * *